United States Patent [19]
Halstead

[11] 3,983,632
[45] Oct. 5, 1976

[54] CONTOUR TRANSFER DEVICE
[76] Inventor: Thomas L. Halstead, 2013 W. Clairmont, Phoenix, Ariz.
[22] Filed: Jan. 26, 1976
[21] Appl. No.: 647,314

[52] U.S. Cl. .............................. 33/175; 33/174 PA; 277/167.5; 277/171
[51] Int. Cl.² .......................................... G01B 5/20
[58] Field of Search ................. 33/175, 176, 174 P, 33/174 PA; 277/167.5, 171

[56] References Cited
UNITED STATES PATENTS
| 678,446 | 7/1901 | Warner | 277/171 X |
| 889,224 | 6/1908 | Haas | 33/175 |
| 2,266,457 | 12/1961 | Wolff | 33/175 |
| 2,621,415 | 12/1952 | Cooper | 33/175 |

Primary Examiner—Harry N. Haroian
Assistant Examiner—Michael H. Thaler

[57] ABSTRACT

The disclosure relates to a contour transfer device which may be used to transfer contours such as those found on the bodies of automobiles so that a proper contour from one side may be transferred to an opposite side of the vehicle which has been damaged.

The disclosure relating specifically to a pair of bars clamped together and with a row of finger receiving openings in which feeler and contour transfer fingers are slideably mounted laterally relative to the bars and wherein the bars are provided with frusto-conical openings in their adjacent sides in which O-rings are nested and frictionally engaged around the fingers and wherein clamp bolts clamp the bars together to compressively force the O-rings into frictional engagement with the feeler and contour transfer fingers so that the fingers may be held in a desired adjusted position.

6 Claims, 5 Drawing Figures

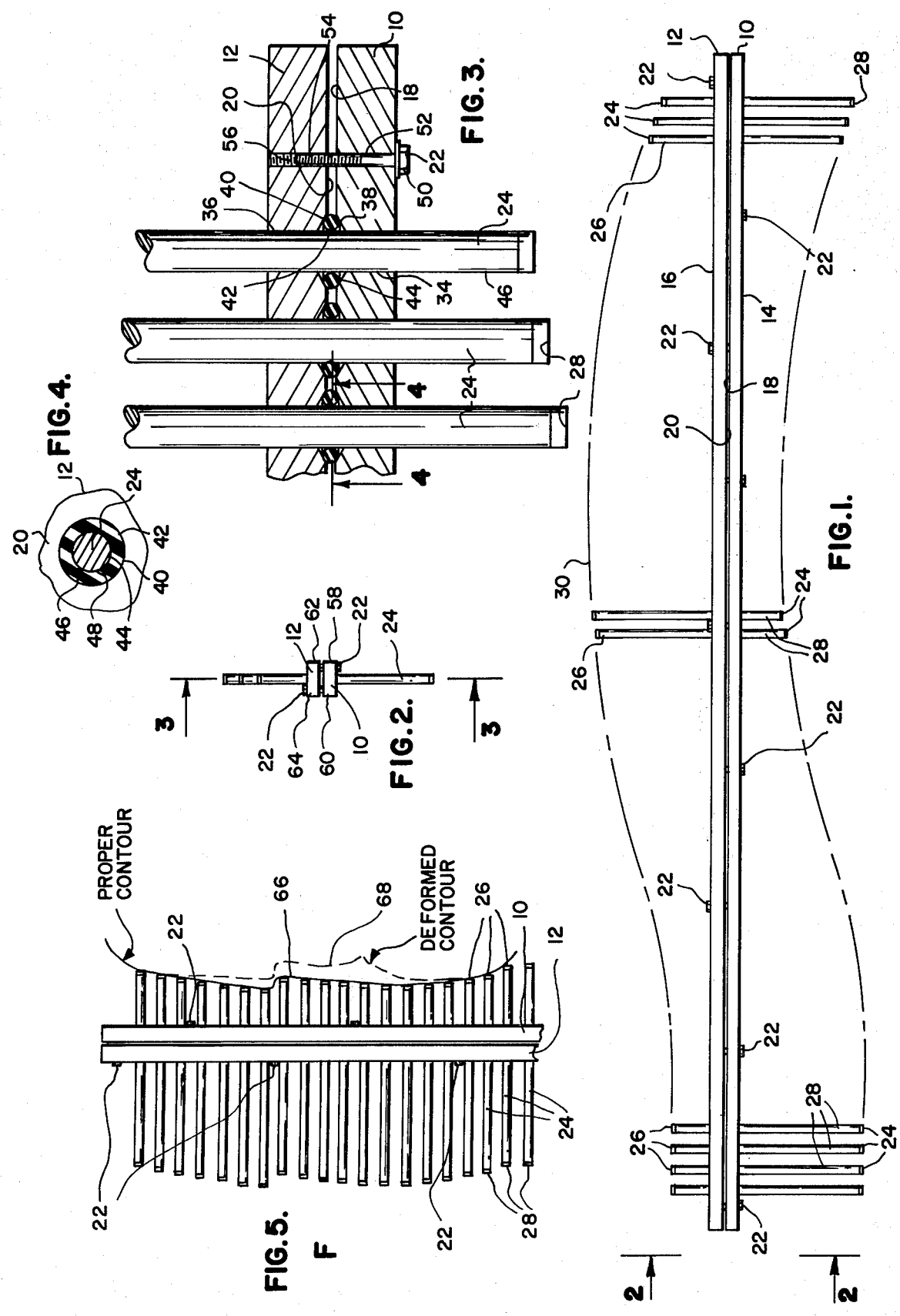

CONTOUR TRANSFER DEVICE

BACKGROUND OF THE INVENTION

Various contour transfer devices have employed bars which are connected together and wherein feeler and contour transfer fingers are slideably extended through openings in the bars and wherein frictional material is disposed in a layer between the bars such that extreme pressure is required to force the bars together such that substantial frictional pressure on feeler fingers extending through the bars may be attained so as to hold the fingers in a proper adjusted position relative to each other to represent a certain contour. The contour transferring devices having a full layer of material between the bars and wherein the contour transfer fingers extend through the bars and the layer of material therebetween require a very substantial amount of pressure forcing the bars together so as to compress the layer of material between the bars and to thereby cause such layer to compressively and frictionally engage the fingers to a degree which affords stable holding of the fingers in an adjusted position relative to each other for accurately transferring a contour, as for example a contour from an undamaged side of a vehicle to a comparable area at the opposite side of the vehicle which has been damaged so that the artist may use the contour transfer device to straighten and return the damaged side to a proper contour. Accordingly, the prior art devices have failed to embody a very lightweight, compact and useful tool which is capable of being properly adjusted so as to maintain a substantial frictional engagement of the contour transfer fingers relative to the holding bar such as to serve accurately without the fingers becoming displaced from their desired adjusted position.

SUMMARY OF THE INVENTION

The present invention comprises a pair of main bars having facing sides and outer sides; the facing sides being adjacent to each other and having facing frusto-conical recesses in which compressable O-rings are disposed and frusto-conical recesses surround openings through the bars which aligned with each other and therein feeler and contour transfer fingers are slideably mounted with the interior of O-rings frictionally engaging the bars and wherein clamp bolt means is disposed to clamp the bars together compressing the O-rings and to thereby cause compressive engagement of the O-rings relative to the feeler and contour transfer fingers.

The aforementioned O-rings have a high coefficient of friction relative to the feeler transfer fingers since the O-rings are made of soft compressable rubber-like material and when they are compressed around the feeler fingers by clamp bolts holding the bars together, they provide for a very substantial frictional holding of the fingers once they are adjusted in the desired position and yet allows the fingers to be forced through the openings in the bars and through the O-rings as desired to attain an adjustment wherein a row of the fingers correspond to a desired contour.

The frusto-conical recesses in the facing sides of the bars are divergingly directed toward the facing sides such that the O-rings are compressed inwardly toward the openings they surround and toward the peripheral portions of the feeler and contour transfer fingers, which are slideably mounted in the bars and supported thereby.

The small area of each O-ring, as it is clamped between the bars, provides for high unit pressure on the O-rings with the intermediate areas of the bars free to be compressed together. Thus, the frictional holding means for the fingers is limited to a minimum area surrounding the fingers, such that clamp bolts clamping the bars together may provide effective clamping and compression of the O-rings without clamping large areas of material between the bars, as is generally the case in the prior art. Thus, clamping is limited only to compression of the O-rings immediately surrounding the fingers, and therefore is very effective in compressing the O-rings and providing for substantial frictional engagement of the O-rings with the bars. This is very distinct from the prior art in that the prior art devices use a layer of compressable material between the bars and the layer generally covers the entire area of the bars such that extreme unit pressure on the bars must be accomplished before sufficient compression results around the feeler fingers to provide substantial frictional engagement therewith for holding the fingers in adjusted position once they are so arranged.

Accordingly, it is an object of the invention to provide a very simple and efficient contour transfer device wherein feeler and contour transfer fingers are efficiently gripped by O-rings compressed between the bars, such that high unit pressure may be exerted on the O-rings by clamp bolts clamping the bars together and thus, affording efficient holding of the fingers in adjusted position.

Another object of the invention is to provide a very compact and efficient contour transfer device which is particularly adapted for use by artist who reconstruct vehicle body contour areas.

Another object of the invention is to provide a contour transfer device which is very simple and economical in production in proportion to its utility.

Another object of the invention is to provide a contour transfer device having a row of adjustable fingers, the ends of which may be accurately adjusted to a desired contour and wherein O-rings clamp between holding bars and surrounding the fingers maintain the fingers in properly adjusted position.

Another object of the invention is to provide a contour transfer device having a pair of bars compressable together against O-rings which surround fingers extending through the bars and whereby the clamp bolts may be very accurately adjusted to attain a desired amount of friction of O-rings in compressive relation to the feeler and contour transfer fingers which are slideably mounted in openings extending through the bars.

Further objects and advantages of the invention may be apparent from the following specification, appended claims, and accompanying drawings.

BRIEF DESCRIPTION OF THE DRAWINGS

FIG. 1 is an elevational view of a contour transfer device in accordance with the present invention, showing a few of the feeler and contour transfer fingers relative to curved broken lines which represent a contour to be followed and to which the fingers may be adjusted. FIG. 1 is an illustration in which some of the aforementioned fingers are omitted to simplify the illustration;

FIG. 2 is an end view of the device taken from the line 2—2 of FIG. 1;

FIG. 3 is an enlarged fragmentary sectional view taken from the line 3—3 of FIG. 2;

FIG. 4 is a fragmentary sectional view taken from the line 4—4 of FIG. 3; and

FIG. 5 is a fragmentary side elevational view of the contour transfer device of the invention shown as it relates to the use of the device in connection with a contour, as for example the contour of an automobile body, and as shown by broken lines, a deformed contour which is to be repaired.

DESCRIPTION OF THE PREFERRED EMBODIMENTS

As shown in FIG. 1, the invention comprises a pair of bars, 10 and 12. These bars are elongated and are provided with respective outer sides 14 and 16 and with respective facing sides 18 and 20. Clamp bolts 22 hold the bars 10 and 12 together, all as will be hereinafter described in detail.

A plurality of feeler and contour transfer fingers 24 are slideably mounted in the bars 10 and 12. These fingers 24 are disposed in a row and closely spaced relative to each other. The fingers 24 are provided with opposite ends 26 and 28, and either of these ends may be matched with a contour, such as illustrated by respective broken lines 30 and 32 in FIG. 1 of the drawings.

With reference to FIG. 3 of the drawings, it will be seen that the facing sides 18 and 20 of the bars 10 and 12, respectively, are slightly spaced apart and the bars 10 and 12 are provided with finger receiving openings 34 and 36 respectively, through which the fingers 24 are slideably mounted. The openings 34 and 36 are axially aligned with each other, and surrounding these openings 34 and 36, in the facing sides 18 and 20, are respective frusto-conical recesses 38 and 40, in which O-rings 42 are nested. These O-rings 42 have central openings 44 which closely engage peripheral portions 46 of the fingers 24.

As shown in FIG. 4 of the drawings, the O-rings 42 are provided with bore portions 48 which engage the peripheral portions 46 of the bars 24.

The clamp bolts 22 are provided with hexagonal head portions 50 adapted to be engaged by a wrench, and the bar 10 is provided with bolt clearance holes 52, through which the bolts 22 extend and these bolts are provided with externally screwthreaded portions 54 which are screwthreadably engaged in internally screwthreaded openings 56 in the bar 12. Thus, when the bolts 22 are tightened, they force the bars 10 and 12 together so as to reduce the spacing between the facings sides 18 and 20 and also the spacing between the frusto-conical portions 38 and 40, which diverge toward their respective facing sides. Thus, these frusto-conical portions 38 and 40, as shown in FIG. 3, diverge relative to each other toward the periphery 46 of the respective finger 24 and thus compressively force the respective compressable O-ring 42 against the peripheral portion 46 so as to provide for frictional engagement therewith; it being noted that the O-rings 42 cover a small area immediately surrounding each finger 24 so as to limit the amount of surface area engaged by the bars 10 and 12 and so as to maintain relatively high unit pressure on the O-rings in proportion to the force applied by the bolts 52 clamping the bars 10 and 12 together.

As shown in FIG. 2 of the drawings, it will be seen that the bars 10 and 12 are generally rectangular in cross section and provided with opposite edges; the bar 10 having opposite edges 58 and 60, while the bar 12 being provided with opposite edges 62 and 64. It will be seen that these opposite edges are substantially spaced from the fingers 24 so that the clamp bolts 22 are disposed between the fingers 24 and said opposite edges thereby allowing proper disposition of the bolts. It will be seen also that the bolts 22 are staggered at opposite sides of the fingers 24, all as shown in FIG. 2 of the drawings.

Attention is directed to FIG. 5, wherein, the ends 26 of the fingers 24 are adjusted to a solid line which represents the contour of a properly shaped body panel in an automobile or the like; this solid line being designated 66 and this is a proper contour. Whereas, the broken line 68 in FIG. 5 represents a deformed contour. In practice, the proper contour 66 may be one side of a vehicle which has not been damaged and the broken line 68 may represent the deformed contour on the opposite side of the vehicle. Accordingly, it will be appreciated that when the ends 26 of the fingers 24 are adjusted to the proper contour 66, that the contour transfer device of the invention may then be carried around to the opposite side of the vehicle and used as a temperate for repairing the deformed contour to the proper contour which is represented by the solid line 66.

It will be understood that adjustment of the clamp bolts 22 provides for a great variety of compression of the O-rings 42 and that substantial compression thereof will cause substantial frictional holding of the fingers 24, so that when they are adjusted to a proper contour, such as the line 66, they are not readily and easily forced out of such position and therefore reliably hold the proper contour 66 so that the ends 26 of the fingers 24 may be used as a reference to which the deformed contour may be reformed so as to return it to the proper contour.

In many instances, door frames of automobiles or other areas surrounding replaceable parts, are dented and in the case where a door has been ordered it may not be received by the repairmen for several months. However, the frame surrounding the door may readily be repaired previous to the arrival of the new door simply by using the contour device of the invention and transferring a proper contour from one side of the vehicle in order to provide a reference for the repair of the opposite side of the vehicle. This may be done before the door or matching adjacent part arrives. Thus, great amounts of time can be saved in the repair of automobile bodies, and this is but one example of the use of the invention. It is obvious that this devise may be used in the repair of boar hulls or in the carpentery trade or in any other area where it is desired to transfer a contour configuration from one structure to another.

It will be obvious to those skilled in the art that various modifications may be resorted to without departing from the spirit of the invention.

I claim:

1. A contour transfer device comprising first and second elongated main bars; said bars disposed in adjacent parallel relation to each other; each of said bars having a facing side and an outer side; said facing side being adjacent to each other; each of said main bars having a plurality of finger receiving holes extending laterally through each of said bars and said holes in each bar disposed in a substantially straight row; the finger receiving holes of said first bar being axially aligned with said holes in said second bar; elongated feeler and contour transfer fingers extending through said aligned finger receiving holes of both of said bars; each bar, in its facing side, having a frusto-conical recess surrounding each of said finger receiving holes therein; said frusto-conical recess diverging toward said facing side; resilient O-rings disposed in said frusto-conical recesses; each of said rings closely surrounding one of said feeler and contour transfer fingers; the cross sectional diameter of each O-ring being sufficient to engage and nest in said frusto-conical recesses and to compressively hold said main bars in slightly spaced apart relation to each other at facing sides; each of said fingers having a peripheral portion; and clamp bolts disposed adjustably to force said main bars together to thereby reduce the spacing between said facing sides of said bars and to thereby compress said resilient O-rings in said Frusto-conical recesses and to thereby cause compressive frictional engagement of each O-ring about the said peripheral portions of a respective one of said feeler and contour transfer fingers whereby said fingers, when longitudinally adjusted in a direction laterally of said bars, will hold an adjusted position with substantial resistence to change.

2. The invention as defined in claim 1, wherein: each of said bars has a generally rectangular cross sectional shape and is provided with opposite edge portions disposed at substantially right angles to said facing sides and said outer sides of said bars.

3. The invention as defined in claim 2, wherein: said edge portions being substantially spaced from said finger receiving holes.

4. The invention as defined in claim 3, wherein: said bars are provided with bolt receiving openings therein; said bolt receiving openings being disposed substantially parallel to said finger receiving openings.

5. The invention as defined in claim 4, wherein: said bolt receiving openings being located between said finger receiving openings and one of said edge portions.

6. The invention as defined in claim 5, wherein: said bolt receiving openings in one of said bars being bolt clearance holes; said bolt receiving openings in the other of said bars being internally screw threaded and adapted to screwthreadably receive said clamp bolts.

* * * * *